United States Patent
Gazda et al.

(10) Patent No.: US 12,299,534 B2
(45) Date of Patent: May 13, 2025

(54) METHOD FOR TRANSFORMING A QUANTUM CIRCUIT WHILE MINIMIZING THE CNOT-COST

(71) Applicant: BULL SAS, Les Clayes sous Bois (FR)

(72) Inventors: Arnaud Gazda, Versailles (FR); Simon Martiel, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 118 days.

(21) Appl. No.: 18/134,280

(22) Filed: Apr. 13, 2023

(65) Prior Publication Data
US 2024/0354610 A1    Oct. 24, 2024

(30) Foreign Application Priority Data
Apr. 13, 2022  (EP) .................................. 22305533

(51) Int. Cl.
*G06N 10/20* (2022.01)
*B82Y 10/00* (2011.01)
*G06N 10/40* (2022.01)

(52) U.S. Cl.
CPC .............. *G06N 10/20* (2022.01); *B82Y 10/00* (2013.01); *G06N 10/40* (2022.01)

(58) Field of Classification Search
CPC ......... G06N 10/20; G06N 10/40; B82Y 10/00
USPC ......... 326/7, 1, 5; 505/170; 714/763; 257/31
See application file for complete search history.

(56) References Cited

U.S. PATENT DOCUMENTS

2017/0316336 A1* 11/2017 Bocharov ............... G06N 10/20
2023/0237361 A1*  7/2023 Cowtan .................... G06N 5/01
                                                              706/62

OTHER PUBLICATIONS

European Search report for corresponding EP Application No. 22305533, dated Oct. 4, 2022.
Martiel et al., "Qubit routing via lazy synthesis", , XP055959847, Retrieved from the Internet: URL:https://arxiv.org/pdf/2012.09663v2.pdf [retrieved on Sep. 12, 2022], pp. 1-31, Nov. 8, 2021.
Hirata et al., "An Efficient Method to Convert Arbitrary Quantum Circuits to Ones on a Linear Nearest Neighbor Architecture", 2009 Third International Conference on Quantum, Nano and Micro Technologies, pp. 26-33, 2009.

(Continued)

*Primary Examiner* — Arnold M Kinkead
(74) *Attorney, Agent, or Firm* — MEAGHER EMANUEL LAKS GOLDBERG & LIAO, LLP

(57) ABSTRACT

The disclosure refers to method for converting an input quantum circuit comprising gates into an output quantum circuit compliant with execution constraints, comprising: determining if a front layer comprises single-qubit gates, and updating the front layer; reiterating the determining step as long as the front layer comprises single-qubit gates; identifying in the front layer a quantum gate that does not satisfy execution constraints; determining a pattern such that the gate satisfies the execution constraints when applying the adjoint pattern to the gate; adding the pattern to the output quantum circuit, and applying the a joint pattern to the gate; and reiterating these steps until each quantum gate in the input quantum circuit satisfies the execution constraints; wherein each pattern is determined in such a way that a number of CNOT-gates comprised by at least one pattern is minimized.

6 Claims, 3 Drawing Sheets

(56) References Cited

OTHER PUBLICATIONS

Li et al., "Tackling the Qubit Mapping Problem for NISQ-Era Quantum Devices", Proceedings of the Twenty-Fourth International Conference on Architectural Support for Programming Languages and Operating Systems, ASPLOS '19. Providence, RI, USA: Association for Computing Machinery, pp. 1001-1014, Apr. 13-17, 2019.
Zhang et al., Optimizing T gates in Clifford+T circuit as $\pi/4$ rotations around Paulis, arXiv:1903.12456v1 [quant-ph], Mar. 29, 2019.

* cited by examiner

METHOD FOR TRANSFORMING A QUANTUM CIRCUIT WHILE MINIMIZING THE CNOT-COST

CROSS-REFERENCE TO RELATED APPLICATIONS

The present application claims priority to European Patent Application 22305533.6, filed Apr. 13, 2022, the contents of which are incorporated by reference herein in its entirety.

TECHNICAL FIELD

The present disclosure generally relates to the field of the transformation of quantum circuits and, in particular, relates to a compiling method for converting an input quantum circuit comprising a sequence of quantum gates into an output quantum circuit compliant with predetermined execution constraints.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

A quantum program corresponds to sequences of instructions, called quantum gates, to be executed on one or more qubits, also referred to as "physical qubits", i.e., actual quantum implementations qubits. A quantum program may be represented by a quantum circuit, wherein the representation of qubits in a quantum circuit may be referred to as "logical qubits".

Any quantum circuit can be decomposed into a sequence of Pauli rotations followed by a Clifford operator (Simon Martiel and Timothde Goubault de Brugière. "*Architecture aware compilation of quantum circuits via lazy synthesis*". 2021. arXiv:2012.09663).

However, most of today's quantum computers can only implement single-qubit gates or CNOT-gates between qubits that support direct coupling. Thus, arbitrary Pauli rotations (i.e., Pauli rotations involving two or more qubits) are likely not implementable on these quantum computers.

Thus, in order to make a quantum circuit executable, circuit transformation is required in order to transform arbitrary Pauli rotations into more basic quantum gates.

Any quantum circuit can be converted into a functionally equivalent quantum circuit comprising only single-qubit quantum gates and CNOT-gates (Michael A. Nielsen and Isaac Chuang. 2002. "*Quantum computation and quantum information*", Cambridge University Press.).

A single-qubit quantum gate is directly executable on a given physical qubit, independent on positions or properties of other qubits of the quantum computer.

However, a CNOT-gate, which is a two-qubit gate, can only be applied to physical qubit pairs which support direct coupling, i.e., on two physically nearby qubits.

However, physical qubits may have arbitrary connections and limited connectivity between them. Thus, for a given quantum circuit and a given coupling information between the physical qubits, an initial logical-to-physical qubit mapping most often does not enable direct execution of the quantum program. When running a quantum program, a mapping of the logical qubits to the physical qubits is needed.

Gushu li, Yufei Ding, Yuan Xie, "*Tackling the Qubit Mapping Problem for NISQ-Era Quantum Devices*", In: *Proceedings of the Twenty-Fourth International Conference on architectural Support for Programming Languages and Operating Systems*. ASPLOS '19. Providence, RI, USA: Association for Computing Machinery, 2019, pp. 1001-1014, considered as the closest prior art, provides a method that uses SWAP-gates in order to make any CNOT-gate executable.

A SWAP-gate can swap two neighboring logical qubits. Thus, a SWAP-gate can move two logical qubits to two physical qubits that support direct coupling, thus making a given CNOT-gate executable.

However, due to the limitations of a real quantum computer, inserting SWAP operations in the quantum circuit will also cause several problems.

First, a qubit can only retain its state for a very short time. It may decay to another state or interact with the environment and lose the original quantum state. The coherence time of state-of-the-art qubits is of the order of 100 µs. All the computation must be accomplished within a fraction of the qubit coherence time, which sets an upper bound to the number of sequential quantum gates that can be applied on qubits.

Second, each quantum operation can introduce errors.

Therefore, it is an important challenge to minimize the number of gates in a quantum program.

Each SWAP-gate can be represented by three CNOT-gates. Therefore, inserting SWAP-gates increases the number of CNOT-operations (referred to as CNOT-cost) in the quantum circuit and the circuit depth, and thus the execution time of the quantum circuit and its vulnerability to errors considerably.

The negative impact of single-qubit gates on the execution time of a quantum circuit is negligible when compared to CNOT-gates. Furthermore, single-qubit gates do not increase the circuit depth.

Accordingly, a need exists for a method for converting an input quantum circuit comprising a sequence of quantum gates into an output quantum circuit compliant with predetermined execution constraints, in such a way that the number of involved CNOT-gates is minimized.

BRIEF SUMMARY

The present disclosure remedies the shortcomings of prior art.

The present disclosure provides a compiling method for iteratively converting an input quantum circuit comprising a sequence of quantum gates into an output quantum circuit compliant with predetermined execution constraints, the method comprising:
  /a/ determining if a front layer of the input quantum circuit comprises at least one single-qubit quantum gate, and, if the front layer comprises at least one single-qubit quantum gate, transferring each of the at least one single-qubit quantum gate to the output quantum circuit, and updating the front layer;
  /b/ reiterating step /a/ as long as the front layer comprises at least one single-qubit quantum gate;
  /c/ identifying in the front layer a quantum gate that does not satisfy at least one of the predetermined execution constraints;

/d/ determining a pattern comprising at least two single-qubit quantum gates and at least one CNOT-gate in such a way that the at least one predetermined execution constraint not satisfied by the quantum gate identified in step /c/ is satisfied by the quantum gate when applying an adjoint of the pattern to the quantum gate;

/e/ adding the pattern to the output quantum circuit, and applying the adjoint of the pattern to the quantum gate identified in step /c/ and to each subsequent quantum gate, /f/ reiterating steps /a/-/e/ until each quantum gate in the input quantum circuit satisfies each of the predetermined execution constraints;

wherein each pattern determined in step /d/ is determined in such a way that a number of CNOT-gates comprised by at least one pattern is minimized.

A quantum circuit is a graphical representation of a quantum program to be executed on a quantum computer. A quantum circuit is composed of quantum gates to be applied to a set of qubits, also referred to as "physical qubits", i.e., actual quantum implementations qubits. The representation of qubits in a quantum circuit is referred to as "logical qubits".

The quantum gates appear in the quantum circuit in an execution order, which corresponds to the order according to which the quantum gates are applied to the qubits over time. Quantum gates that are executed subsequently correspond to a multiplication of unitary operators representing these quantum gates.

Hereafter, the expressions "gate" and "operator" are used as synonyms, since they both refer to the same operation.

A qubit has two basic states, denoted as |0> and |1>. The state of a qubit can be described as a linear combination of the two basic states, represented by $|\psi\rangle = \alpha|0\rangle + \beta|1\rangle$, where $\alpha, \beta \in \mathbb{C}$ and $|\alpha|^2 + |\beta|^2 = 1$.

The application of a quantum gate to a qubit state modifies the state of the qubit. A single-qubit quantum gate is applied to one single qubit. A two-qubit gate is applied to two qubits and can lead to entanglement of these two qubits.

The execution of a quantum program may comprise, besides the execution of the quantum gates of the quantum circuit, a final measurement. The final measurement allows determining a state of the physical qubits resulting from the quantum gates applied to them.

A front layer is defined by the quantum gates that it comprises. The front layer of a quantum circuit comprises all quantum gates that mutually commute and that have no preceding gates that do not satisfy any predetermined execution constraints. The front layer may comprise one or several quantum gates.

Any quantum circuit can be decomposed into a sequence of Pauli rotations followed by a Clifford operator.

A single-qubit quantum gate may be the identity operator. Thus, in the case that both single-qubit operators are identity operators, the pattern corresponds to a CNOT-gate.

A single-qubit quantum gate may be a single-qubit Pauli operator. Single-qubit Pauli operators $R_P(\theta)$ may be represented as $$R_P(\theta) = \exp(-i\frac{\theta}{2}\sigma_P),$$

wherein P=x, y, z and $$\sigma_x = \begin{pmatrix} 0 & 1 \\ 1 & 0 \end{pmatrix}, \sigma_y = \begin{pmatrix} 0 & -1 \\ i & 0 \end{pmatrix}, \sigma_z = \begin{pmatrix} 1 & 0 \\ 0 & -1 \end{pmatrix}.$$

θ is a rotation angle.

Pauli operators acting on more than one qubit such as two-qubit Pauli operators can be constructed by tensorial products of single-qubit operators. For example, a two-qubit Pauli rotation may be represented as $$R_{xy}(\theta) = \exp(-i\frac{\theta}{2}\sigma_x \otimes \sigma_y).$$

Clifford operators are elements of the Clifford group which is defined as the group of unitaries that normalize the Pauli group. Examples of single-qubit Clifford operators are the identity operator $$I = \begin{pmatrix} 1 & 0 \\ 0 & 1 \end{pmatrix},$$

the Hadamard-operator $$H = \frac{1}{\sqrt{2}}\begin{pmatrix} 1 & 1 \\ 1 & -1 \end{pmatrix},$$

or the Pauli-operator for a rotation about the x-axis by an angle of $$\frac{\pi}{2}: R_x\left(\frac{\pi}{2}\right) = \frac{1}{\sqrt{2}}\begin{pmatrix} 1 & i \\ i & 1 \end{pmatrix}.$$

An example of a two-qubit Clifford operator is the CNOT-gate. A CNOT-gate ("Controlled NOT-gate") is a two-qubit gate, applied on two qubits that are directly connected. A CNOT-gate will flip a target qubit based on a control qubit.

A Clifford operator that is present at the end of the sequence of quantum gates, i.e., that has passed through the quantum circuit by having been applied to all quantum gates, can be combined with the final measurement.

A predetermined execution constraint relates to the fact that most quantum programs cannot be directly executed on quantum computers.

One predetermined execution constraint may be a topological constraint: Qubits may have arbitrary connections and limited connectivity between them. Thus, two-qubit gates such as CNOT-gates can only be applied to limited logical qubit pairs, the corresponding physical qubit pairs of which support direct coupling. A single-qubit quantum gate can be executed directly, independent on properties or positions of other qubits.

Another predetermined execution constraint may be related to the fact that most of today's quantum computers can only implement single-qubit quantum gates or CNOT-gates. Arbitrary Pauli rotations (i.e., Pauli rotations involving two or more qubits) are likely not implementable on these quantum computers.

Any quantum circuit can be converted into a functionally equivalent quantum circuit comprising only single-qubit quantum gates and CNOT-gates. Such a quantum circuit is executable as long as CNOT-gates are applied to qubits that support direct coupling. Thus, a given input quantum circuit does generally not satisfy predetermined execution constraint. It may, however, be converted into an output quantum circuit comprising single-qubit quantum gates and CNOT-gates and that is executable, i.e., that satisfies the predetermined execution constraints.

"Compiling" an input quantum circuit refers to a transformation of an input quantum circuit that is not executable into an output quantum circuit that is executable.

An input quantum circuit $G_{in}$ may be represented as follows: $G_{in} = g_n g_{n-1} \ldots g_3 g_2 g_1$. The output quantum circuit may be iteratively constructed from the input quantum circuit. The output quantum circuit is empty before carrying out the compiling method: $G_{out} = I$.

The combination (i.e., the multiplication) $G_{in} G_{out} = g_n g_{n-1} \ldots g_3 g_2 g_1$ of the input quantum circuit $G_{in}$ and the output quantum circuit $G_{out}$ functionally stays the same during the execution of the method. Having terminated the compilation method, the input quantum circuit will be empty $G_{in} = 1$, and $G_{out}$ will be functionally equivalent to $G_{in}$, but only comprise quantum gates that satisfy the execution constraints.

All single-qubit quantum gates may be removed from the front layer. For example, if the front layer consists of the first, second and third gates $g_1$, $g_2$, $g_3$, and if the third gate $g_3$ is a single-qubit quantum gate, it can be transferred to the output circuit.

$$G_{in} = g_n g_{n-1} \ldots g_2 g_1; G_{out} = g_3.$$

The front layer may then be updated, i.e., further quantum gates adjacent to the front layer and that commute with the remaining gates of the front layer may be included in the front layer.

If the updated front layer comprises single-qubit quantum gates, they may be removed from the updated front layer. The updating of the front layer and the removal of single-quantum gates may be done until the updated front layer does not comprise any single-qubit quantum gates.

It can be further assumed that quantum gate $g_1$ does not satisfy at least one predetermined execution constraint. Applying an adjoint pattern $P^+_1$ comprising at least two single-qubit quantum gates and at least one CNOT-gate to said quantum gate $g_1$ may transform said quantum gate $g_1$ such that it satisfies said predetermined execution constraints. The CNOT-gate that is part of pattern $P^+_1$ may be chosen such that it acts on two qubits that support direct coupling.

Applying a pattern to a quantum gate refers to a multiplication of the operator representing the pattern with the operator representing the quantum gate. The multiplication of the pattern $P_1$ and its adjoint $P^+_1$, i.e., $(P^+_1 P_1)$ corresponds to the identity operator $P^+_1 P_1 = 1$, which can be inserted into the circuit without changing the properties of the quantum circuit.

An adjoint matrix $P^+_1$ corresponds to the transposed of the complex conjugate matrix $P_1$. An adjoint of an operator $P_1$ is an operator $P^+_1$, corresponding to a generalization of an adjoint matrix.

$$G_{out} = g_3; G_{in} = g_n g_{n-1} \ldots g_2 g_1 P^+_1 P_1;$$

Here, the operator $P_1$ and its adjoint operator $P^+_1$ are composed of the same gates. However, the operator $P_1$ differs from its adjoint operator $P^+_1$ by the order of the gates of which both operators are composed.

$P^+_1$ converts $g_1$ to $g'_1$, which is now executable. The adjoint pattern $P_1$ further updates all subsequent gates $g_n g_{n-1} \ldots g_3 g_2$ to $g'_n g'_{n-1} \ldots g'_3 g'_2$, in general without making them executable. The operator $P_1$ can, since it satisfies all execution constraints, be transferred to the output quantum circuit.

$$G_{out} = P_1 g_3; G_{in} = g_n g_{n-1} \ldots g_2 g_1 P^+_1 = P^+_1 g'_n g'_{n-1} \ldots g'_2 g'_1.$$

CNOT-gates that are part of the pattern can be combined with the final measurement, since CNOT-gates are Clifford gates. If the single-qubit quantum gates are Clifford-gates, they may be combined with the final measurement as well. The number of CNOT-gates comprised by a quantum circuit may be referred to as "CNOT-cost", relating to the fact that CNOT-gates considerably slow down execution of a quantum circuit when compared to single-qubit quantum gates. Single-qubit quantum gates do not contribute to the CNOT-cost.

The described method may now be reexecuted.

The converted quantum gate $g'_1$ can be, since it is executable, i.e., a single-qubit quantum gate, transferred to the output quantum circuit. Adjoint pattern $P^+_1$ "at the end" of the sequence of quantum gates can be combined with the final measurement and will not be considered further.

$$G_{out} = g'_1 P_1 g_3 \; ;; G_{in} = g'_n g'_{n-1} \ldots g'_2.$$

The method is executed until each quantum gate of the input quantum circuit satisfies the predetermined execution constraints and is added to the output quantum circuit, which may lead to, for the present example:

$$G_{out} = g''_n P_n g''_{n-1} P_{n-1} \ldots g''_2 P_2 g'_1 P_1 g_3 \text{ and } G_{in} = 1.$$

$g''_2$, $g''_3$ etc. are quantum gates satisfying all execution constraints and result from the transformation of quantum gates $g_2$-$g_3$ etc.

The resulting quantum circuit $G_{out}$ is functionally equivalent to the input Gi, quantum circuit. However, contrary to the input quantum circuit, the output quantum circuit is executable.

There may be several combinations of adjoint patterns that make quantum gates of a front layer executable.

Different approaches, also referred to as heuristics, may be used in order to minimize the number of CNOT-gates involved. A heuristic may allow determining patterns or combinations of patterns with a minimum CNOT-cost.

The calculation shown above considers the case that the single-qubit quantum gates comprised by the adjoint $P^+_1$ pattern are Clifford-gates, and that they can be combined with the final measurement. If the single-qubit quantum gates comprised by the adjoint pattern are no Cifford-gates, they would have to be added to the output-circuit. In this case, only the CNOT-gates could be combined with the final measurement.

The proposed method aims to respond to the drawbacks mentioned above by proposing a compiling method for converting an input quantum circuit composed of a sequence of quantum gates into an output quantum circuit compliant with predetermined execution constraints.

The method allows making all gates in an input quantum circuit executable, while minimizing the number of CNOT-gates present in the output quantum circuit.

The method is innovative in that a pattern and its adjoint are added to the output circuit in order to make a given quantum gate executable, and that the adjoint pattern can be combined, after application of the adjoint pattern to all subsequent quantum gates in the input quantum circuit, with the final measurement.

The method is further innovative in that the pattern makes the quantum gates executable while minimizing a number of CNOT-gates comprised by at least one pattern.

The method allows determining the number of CNOT-gates needed to implement at least one quantum gate of the front layer that does not satisfy at least one of the predetermined execution constraints.

The number of involved CNOT-gates is minimized, and hence the execution time of the quantum circuit and the probability that errors are introduced during the execution of the quantum circuit is minimized.

In one embodiment, the at least two single-qubit quantum gates comprised by the pattern are Clifford gates.

When the single-qubit quantum gates are Clifford gates, the single-qubit quantum gates can be combined with the final measurement, which decreases the number of quantum gates present in the output circuit, and thus the probability that errors are introduced when executing the output quantum circuit.

In one embodiment, each pattern determined in step /d/ is determined in such a way that a number of CNOT-gates comprised by each pattern is minimized.

A heuristic $H_1$ may be defined as follows, wherein the quantum gates are represented as Pauli-rotations $R_P(\theta)$):

$$H_1(F) = \min\{\text{Cost}(R_P(\theta))\}$$

The heuristic as defined constitutes an approach to minimize the number of CNOT-gates comprised by each pattern. For each quantum gate that does not satisfy at least one execution constraint, there may be different patterns that make the quantum gate executable. Among those patterns, it may be chosen the pattern that comprises the least CNOT-gates. An algorithm based on this heuristic has high chances to converge, i.e., to determine a pattern that has a minimum CNOT-cost.

In another embodiment, each pattern determined in step /d/ is determined in such a way that a weighted sum of number of CNOT-gates comprised by each pattern is minimized.

A heuristic $H_2$ may be defined as follows, wherein the quantum gates are represented as Pauli-rotations $R_p(\theta)$):

$$H_2(F) = \sum_{R_P(\theta)} \frac{\text{Cost}(R_P(\theta))}{\delta^{\text{index}(R_P(\theta))}}$$

For the quantum gates present in a front layer, there may be different combinations of patterns making all quantum gates of the front layer executable. Among those combinations of patterns, it may be chosen the combination of patterns for which a weighted sum of CNOT-gates of all involved quantum gates is minimized.

The weighted sum runs over all quantum gates in the front layer.

In order to calculate the weighted sum, the CNOT-cost may be determined for each Pauli rotation in the front layer, and the CNOT-cost for each gate may be arranged in a sequence in ascending order, and an index may be assigned to each CNOT-cost.

For example, the first element of the sequence having the lowest CNOT-cost may be assigned index=0, the element of the sequence having the second-lowest CNOT-cost may be assigned index=1, etc.

In principle, the are no restrictions regarding the value of 8. Preferably, 8 is comprised in a range from 1 to 3.

An algorithm based on this heuristic has high chances to converge, i.e., to determine a pattern for a given quantum gate that has a minimum CNOT-cost, while minimizing the total CNOT-cost of the front layer.

In another embodiment, each pattern determined in step /d/ is determined in such a way that a sum of number of CNOT-gates comprised by each pattern is minimized.

A heuristic $H_3$ may be defined as follows, wherein the quantum gates are represented as Pauli-rotations $R_p(\theta)$):

$$H_3(F) = \sum_{R_P(\theta)} \text{Cost}(R_P(\theta))$$

For the quantum gates present in a front layer, there may be different combinations of patterns making all quantum gates of the front layer executable. Among those combinations of patterns, it may be chosen the combination of patterns for which a sum of CNOT-gates of all involved quantum gates is minimized.

An algorithm based on this heuristic minimizes the total CNOT-cost of the front layer.

Another aspect of the disclosure is related to a non-transitory computer readable storage medium, having stored thereon a computer program comprising program instructions, the computer program being loadable into a data-processing unit and adapted to cause the data-processing unit to carry out a compiling method for iteratively converting an input quantum circuit comprising a sequence of quantum gates into an output quantum circuit compliant with predetermined execution constraints, the method having the properties cites above.

BRIEF DESCRIPTION OF THE DRAWINGS

The accompanying drawings, which are incorporated herein and form a part of the specification, illustrate the present invention and, together with the description, further serve to explain the features of the invention and to enable a person skilled in the pertinent art to make and use the invention. In the drawings, like reference characters indicate identical or functionally similar elements.

DETAILED DESCRIPTION

A method for iteratively converting an input quantum circuit comprising a sequence of quantum gates into an output quantum circuit compliant with predetermined execution constraints may be implemented according to several embodiments.

In the description hereafter, several non-limiting embodiments are presented.

Figure 1:
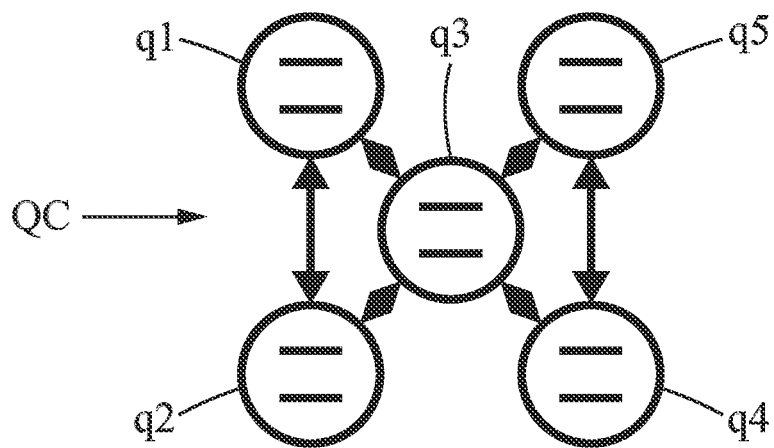
FIG. 1 is a schematic representation of a five-qubit device.

FIG. 1 is a schematic representation of a five-qubit device QC, which may be a specific embodiment of hardware of a quantum computer.

The five-qubit device QC comprises five physical qubits some of which are interconnected. Physical qubits are actual quantum implementations of qubits. The first, second, *fourth* and fifth qubits $q_1$, $q_2$, $q_4$, $q_5$ are directly connected to the third qubit $q_3$. However, first, second, fourth and fifth qubits $q_1$, $q_2$, $q_4$, $q_5$ have no mutual connections.

Figure 2:
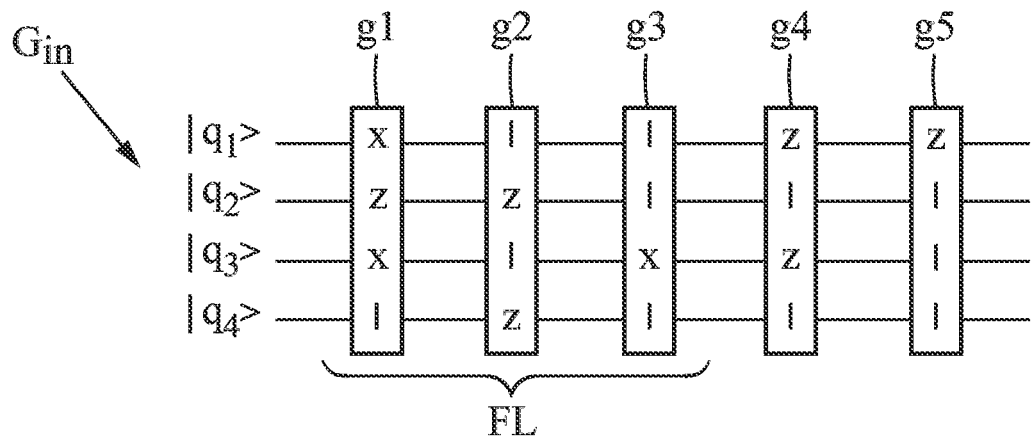
FIG. 2 shows a quantum circuit comprising a sequence of Pauli rotations.

A quantum circuit $G_{in}$ as shown by FIG. 2 may be executed on this five-qubit device QC. A quantum circuit $G_{in}$, which is a graphical representation of a quantum program, is composed of quantum gates to be applied to a set of qubits.

Quantum circuits are written such that the horizontal axis is time. The quantum circuit starts at the left side and ends at the right. Horizontal lines are qubits. The quantum gates appear in the quantum circuit in a sequence in an execution order, which corresponds to the order according to which the quantum gates are applied to the qubits over time. Quantum gates that are executed subsequently correspond to a multiplication of quantum unitary operators representing these quantum gates.

Hereafter, the expressions "gate" and "operator" are used as synonyms, since they both refer to the same operation.

The execution of a quantum program comprises the execution of the quantum gates of the quantum circuit, and a final measurement. The final measurement allows determining a state of the physical qubits resulting from the quantum gates applied to them.

The representation of qubits $|q_1\rangle$, $|q_2\rangle$, $|q_3\rangle$, $|q_4\rangle$ in a quantum circuit $G_{in}$ is referred to as "logical qubits". In this specific implementation, the fifth physical qubit $q_5$ has (in this specific implementation) no counterpart in the quantum circuit.

Any quantum circuit can be decomposed into a sequence of Pauli rotations followed by a Clifford operator. The concept of Clifford operators is explained further in the frame of FIGS. 3a, 3b, and 4. Thus, the representation of FIG. 2 is a general representation of a quantum circuit.

Each quantum gate $g_1$, $g_2$, $g_3$, $g_4$, $g_5$ in the quantum circuit $G_{in}$ as shown in FIG. 2 comprises a Pauli-rotation. The quantum circuit $G_{in}$ can be represented as a multiplication of the unitary operators representing the quantum gates: $G_{in}=g_5 g_4 g_3 g_2 g_1$.

The third and fifth quantum gates $g_3$, $g_5$ are single-qubit Pauli rotations i.e., quantum gates that act on one single qubit. For example, the third quantum gate $g_3$ represents a Pauli-rotation around the x-axis acting on the third qubit $|q_3\rangle$.

The second and fourth quantum gates $g_2$, $g_4$ show two-qubit Pauli rotations i.e., quantum gates that act on two qubits. For example, the second quantum gate $g_2$ represents a Pauli-rotation around the z-axis acting on the second qubit $|q_2\rangle$ and a Pauli-rotation around the z-axis acting on the fourth qubit $|q_4\rangle$.

The first quantum gate $g_1$ is a three-qubit gate, i.e., a quantum gate that acts on three qubits. The first quantum gate $g_1$ represents a Pauli-rotation around the x-axis acting on the first qubit $|q_1\rangle$ and simultaneously a Pauli-rotation around the z-axis acting on the second qubit $|q_2\rangle$ and a Pauli-rotation around the x-axis acting on the third qubit $|q_3\rangle$.

Single-qubit Pauli operators $R_P(\theta)$ may be represented as $$R_P(\theta) = \exp(-i\frac{\theta}{2}\sigma_P),$$

wherein p=x, y, z and $$\sigma_x = \begin{pmatrix} 0 & 1 \\ 1 & 0 \end{pmatrix}, \sigma_y = \begin{pmatrix} 0 & -i \\ i & 0 \end{pmatrix}, \sigma_z = \begin{pmatrix} 1 & 0 \\ 0 & -1 \end{pmatrix}.$$

$\theta$ is a rotation angle. Pauli operators acting on more than one qubit such as two-qubit Pauli operators can be constructed by tensorial products of single-qubit operators. For example, the first quantum gate $g_1$ may be represented as $$R_{xzxI}(\theta) = \exp(-i\frac{\theta}{2}\sigma_x \otimes \sigma_z \otimes \sigma_x \otimes I),$$

wherein I is the identity operator.

Quantum gates acting on two or more qubits cannot be executed by most of today's quantum computers, since they do not satisfy predetermined execution constraints.

One predetermined execution constraint may be a topological constraint: Qubits may have arbitrary connections and limited connectivity between them. Thus, two-qubit gates such as CNOT-gates can only be applied to limited logical qubit pairs, the corresponding physical qubit pairs of which support direct coupling. On the contrary, a single-qubit quantum gate can be executed directly, independent on properties or positions of other qubits.

Another predetermined execution constraint may be related to the fact that most of today's quantum computers can only implement single-qubit quantum gates or CNOT-gates. Arbitrary Pauli rotations (i.e., Pauli rotations involving two or more qubits) are likely not implementable on these quantum computers.

The CNOT-gate is a two-qubit gate and can be executed on two qubits that support direct coupling.

The first, second and fourth qubits $g_1$, $g_2$, $g_4$ in the quantum circuit $G_{in}$ are not executable directly, since they act on two or more qubits. The third quantum gates $g_3$, $g_5$ is a single-qubit quantum gate and can be executed directly, independent on positions or properties of other qubits.

The first, second and third quantum gates $g_1$, $g_2$, $g_3$ form a front layer FL. The front layer comprises all quantum gates that have no unexecuted predecessors and that commute with each other. If there is only one quantum gate without unexecuted predecessors and no further quantum gates that commute with this quantum gate, then the front layer FL may only comprise one single quantum gate.

Every Pauli-operator commutates with the identity operator I and with itself, but not with other Pauli-operators.

When considering the first and second quantum gates $g_1$, $g_2$, one finds that the part of the first quantum gate $g_1$ acting on the first qubit $|q_1\rangle$ is a Pauli-rotation around the x-axis, and the part of the second quantum gate $g_2$ acting on the first qubit $|q_1\rangle$ is the identity operator I. Thus, the elements regarding the first qubit $|q_1\rangle$ of the first and second quantum gates $g_1$, $g_2$ commute. Similar arguments hold for all other components of $g_1$ and $g_2$, and further for all components of $g_3$.

However, fourth and fifth quantum gates $g_4$ and $g_5$ do not commute with all of their predecessors, i.e., the first three quantum gates $g_1$, $g_2$, $g_3$. Thus, the first, second and third quantum gates $g_1$, $g_2$, $g_3$ form the front layer.

The first and second quantum gates $g_1$, $g_2$ act on at least two qubits and are not directly executable.

Figure 3A:
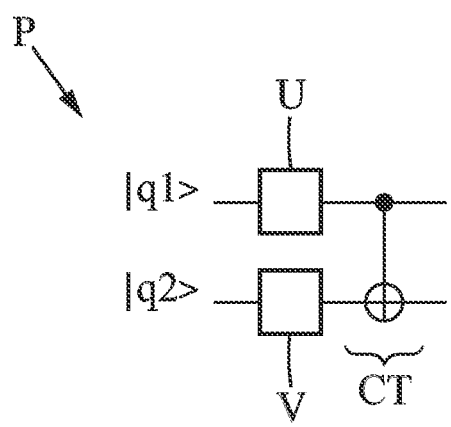
FIGS. 3a and 3b show adjoint patterns that may be inserted in a quantum circuit in order to make the quantum circuit executable.
Figure 3B:
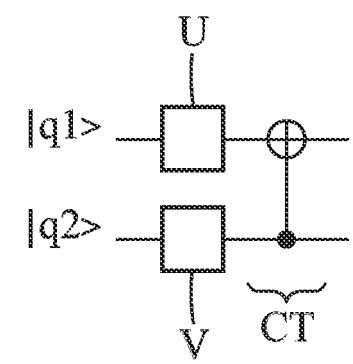

FIGS. 3a and 3b shows two adjoint patterns P⁺ of the invention that may be inserted into the quantum circuit $G_{in}$ in order to make quantum gates executable.

A pattern P may be determined in such a way that the at least one predetermined execution constraint not satisfied by a quantum gate $g_1$ is satisfied by the quantum gate $g_1$ when applying the corresponding adjoint pattern P⁺ to it.

Each pattern P is a subcircuit that acts on two qubits. Each pattern P comprises two single-qubit quantum gates U, V represented by different blocks on the lines representing the qubits, and a CNOT-gate CT represented by a line connecting two qubits. Several of corresponding adjoint patterns P may be applied subsequently to a give quantum gate in order to make it executable. A CNOT-gate CT ("Controlled NOT-gate") is a two-qubit gate that is applied here to two qubits that support direct coupling. A CNOT-gate will flip a target qubit based on a control qubit.

FIGS. 3a and 3b differ by the direction of the CNOT-gate CT. In FIG. 3a, the state of the first qubit $|q_1\rangle$ is flipped in dependence on the state of the second qubit $|q_2\rangle$. In FIG. 3b, the state of the second qubit $|q_2\rangle$ is flipped in dependence on the state of the first qubit $|q_1\rangle$.

Examples of single-qubit quantum gates U, V that may be part of the pattern P are the identity operator $$I = \begin{pmatrix} 1 & 0 \\ 0 & 1 \end{pmatrix},$$

the Hadamard operator $$H = \frac{1}{\sqrt{2}}\begin{pmatrix} 1 & 1 \\ 1 & -1 \end{pmatrix},$$

or the Pauli operator for a rotation around the x-axis by $$\frac{\pi}{2}: R_x\left(\frac{\pi}{2}\right) = \frac{1}{\sqrt{2}}\begin{pmatrix} 1 & i \\ i & 1 \end{pmatrix}.$$

One or both of the single-qubit quantum gates of the pattern may be identity operators. If both single-qubit quantum gates are identity operators, the pattern corresponds to a CNOT-gate.

However, other quantum gates such as $R_y$ may be used as single-qubit quantum gates U, V, in the pattern P as well. However, it is advantageous to use single-qubit Clifford-gates, as will explained in the frame of FIG. 4. The identity operator I, the Hadamard operator H and the Pauli operator for a rotation around the x-axis by $$\frac{\pi}{2}: R_x\left(\frac{\pi}{2}\right)$$

are Clifford operators.

An arbitrary quantum circuit can be expressed by combinations of single-qubit quantum gates and CNOT-gates.

Application of the adjoint patterns P⁺ of FIG. 3a and FIGS. 3b to the quantum circuit $G_{in}$ of FIG. 2 can transform said quantum circuit $G_{in}$ into an executable quantum circuit $G_{out}$, i.e., into a quantum circuit $G_{out}$ only comprising single-qubit quantum gates and CNOT-gates between qubits that support direct coupling.

An adjoint pattern P⁺ according to FIG. 3a and FIGS. 3b and any combination of these patterns can be inserted in the input quantum circuit and has the potential to make the input quantum circuit executable.

Figure 4:
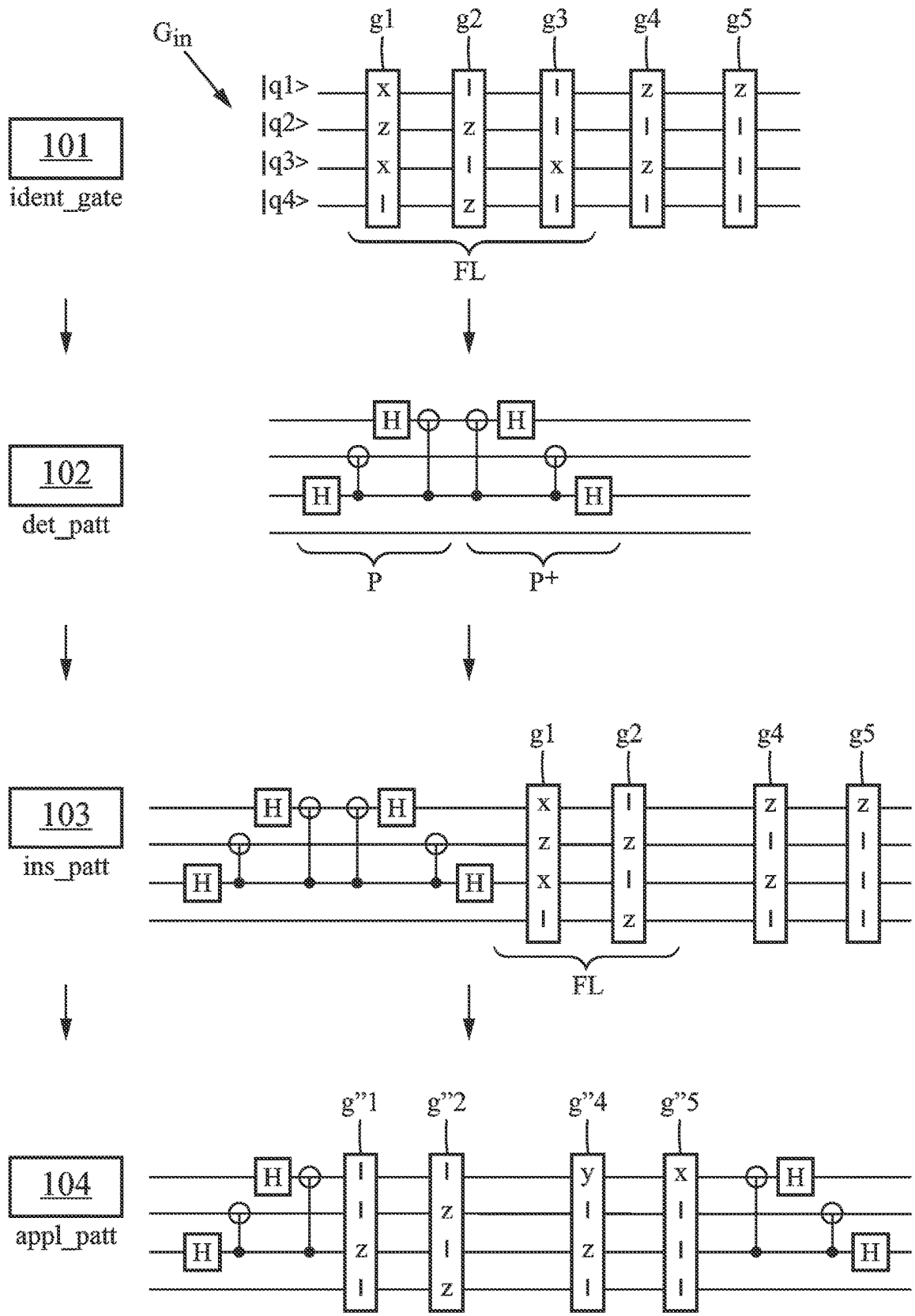
FIG. 4 shows an organigram of a method for iteratively converting an input quantum circuit comprising a sequence of quantum gates into an output quantum circuit compliant with predetermined execution constraints.

FIG. 4 shows an organigram of a compiling method for making the quantum circuit Gm of FIG. 2 that does not satisfy execution constraints executable.

The input quantum circuit $G_{in}$ can be represented as multiplication of the input quantum gates $G_{in}=g_5g_4g_3g_2g_1$. The output quantum circuit $G_{out}$ that will iteratively constructed from the input quantum circuit $G_{in}$ is empty at the beginning and can be represented by the identity operator $G_{out}=1$.

$$G_{in} = g_5g_4g_3g_2g_1; G_{out} = 1;$$

The product of the output quantum circuit $G_{out}$ and the input quantum circuit $G_{in}$ $G_{in}G_{out}=g_5g_4g_3g_2g_1$ will functionally stay the same when carrying out the method, wherein quantum gates of the input quantum circuit $G_{in}$ are made executable step by step and transferred to the output quantum circuit $G_{out}$.

In a first step 101, a front layer FL may be determined. The front layer FL=$[g_1,g_2,g_3]$ consists of the first, second and third quantum gates $g_1$, $g_2$, $g_3$.

It may be then verified whether the front layer FL comprises single-qubit quantum gates. If the front layer comprises one or more single-qubit quantum gate, all single-qubit quantum gates may be transferred, as they satisfy all predetermined execution constraints, from the input quantum circuit $G_{in}$ to the output quantum circuit $G_{out}$. The third quantum gate $g_3$ is a single-qubit quantum gate, and it is added to the output quantum circuit $G_{out}$ and removed from the input quantum circuit $G_{in}$. The updated front layer now consists of the first and second quantum gates $g_1$, $g_2$, $$G_{out} = g_3; G_{in} = g_5g_4g_2g_1; FL = [g_1, g_2].$$

The front layer FL may then be further updated. However, the fourth quantum gate $g_4$ does not commute execute with all of its predecessors. The fourth quantum gate $g_4$ commutes the second quantum gate $g_2$, but not with the first quantum gate $g_1$. The same arguments hold for the fifth quantum gate $g_5$. Thus, the updating does not add new quantum gates to the front layer FL.

In a second step 102, the first step 101 may be reiterated if the updated front layer comprises one or more single-qubit quantum gates.

Since the updating does not add new quantum gates to the front layer FL, the front layer does not contain single-qubit quantum gates, since all single-qubit quantum gates formerly comprised by the front layer were added to the output circuit in the first step 101.

In a third step 103, a quantum gate in the front layer that does not satisfy predetermined execution constraints is identified. As mentioned, the first and second quantum gates $g_1$, $g_2$ do both not satisfy predetermined execution constraints.

In a fourth step 104, an adjoint pattern $P^+$ is determined that has the potential to make the first quantum gate $g_1=R_{xzxI}$ executable when applying the corresponding adjoint pattern $P^+$ to the first quantum gate $g_1$.

When choosing an adapted form of a pattern P for a given quantum gate, the tables below can be considered. The first table shows commutation relations between the Hadamard-operator and Pauli-gates. $R_{in}*H=\text{phase}*H*R_{out}$.

| $R_{in}$ | I | X | Y | Z |
|---|---|---|---|---|
| phase | 1 | 1 | −1 | 1 |
| $R_{out}$ | I | Z | Y | X |

For example: $R_x*=H*R_z$. The Hadamard-operator "passes through" the single-qubit Pauli operator by updating it.

The second table below shows commutation relations between the Pauli-operator for a rotation about the x-axis by an angle of $$\frac{\pi}{2}: R_x\left(\frac{\pi}{2}\right) = \frac{1}{\sqrt{2}}\begin{pmatrix} 1 & i \\ i & 1 \end{pmatrix}$$

operator and the Pauli-gates.

$$R_{in} * R_x\left(\frac{\pi}{2}\right) = \text{phase} * R_x\left(\frac{\pi}{2}\right) * R_{out}.$$

| $R_{in}$ | I | X | Y | Z |
|---|---|---|---|---|
| phase | 1 | 1 | 1 | −1 |
| $R_{out}$ | I | X | Z | Y |

For example:

$$R_y * R_x\left(\frac{\pi}{2}\right) = R_x\left(\frac{\pi}{2}\right) * R_z.$$

The Pauli-operator $$R_x\left(\frac{\pi}{2}\right)$$

"passes through" the single-qubit Pauli operator by updating it.

The third table below shows commutation relations between a two-qubit Pauli-gate and the CNOT-gate. $R_{in}*\text{CNOT}=\text{phase}*\text{CNOT}*R_{out}$

| $R_{in}$ | II | IX | IY | IZ | XI | XX | XY | XZ | YI | YX | YY | YZ | ZI | ZX | ZY | ZZ |
|---|---|---|---|---|---|---|---|---|---|---|---|---|---|---|---|---|
| phase | 1 | 1 | 1 | 1 | 1 | 1 | 1 | −1 | 1 | 1 | −1 | 1 | 1 | 1 | 1 | 1 |
| $R_{out}$ | II | IX | ZY | ZZ | XI | YZ | YZ | YY | YX | YI | XZ | XY | ZI | ZX | IZ | IZ |

For example: $R_{zz}*\text{CNOT}=\text{CNOT}*R_{Iz}$. The CNOT-gate CT "passes through" the two-qubit Pauli-gate by updating it.

An adapted adjoint pattern $P^+$ that has the potential to simplify the first quantum gate $g_1=R_{xzxI}$ is $P^+{}_1=H_3*\text{CNOT}_{23}$. The indices of the operators refer to the qubit to which the adjoint pattern $P^+{}_1$ is applied. The CNOT-gate $\text{CNOT}_{23}$ acts on the second and third qubits $|q_2\rangle$ and $|q_3\rangle$, which support direct coupling (as shown in FIG. 1 and as explained above), and thus the CNOT-gate $\text{CNOT}_{23}$ is directly executable.

Thus, applying the adjoint pattern $P^+{}_1=H_3*\text{CNOT}_{23}$ to the first quantum gate $g_1$ corresponds to an application of the Hadamard-operator the third qubit $|q_3\rangle$, and then a CNOT-gate CT between the second and third second qubits $|q_2\rangle$, $|q_3\rangle$. According to the commutation relations shown above, one finds:
$g_1P^+{}_1=R_{xzxI}H_3\text{CNOT}_{23}=H_3R_{xIzI}\text{CNOT}_{23}=H_3\text{CNOT}_{23}R_{xIzI}$.

Thus, quantum gate $g_1=R_{xzxI}$, which is a three-qubit gate, may be simplified to $g'_1=R_{xIzI}$, which is a two-qubit gate, by applying the adjoint pattern $P^{+*}=H_3*\text{CNOT}_{23}$ to it.

An adapted adjoint pattern $P^{+\prime\prime}{}_1$ to further simplify $g'_1=R_{xIzI}$ may be $P^{+\prime\prime}{}_1=H_1*\text{CNOT}_{13}$: $g'_1P^{+\prime\prime}{}_1=R_{xIzI}H_1\text{CNOT}_{13}=H_1R_{zIzI}\text{CNOT}_{13}=H_1\text{CNOT}_{13}R_{IIzI}$.

Thus, quantum gate $g'_1=R_{xIzI}$, which is a two-qubit gate, may be simplified to $g''_1=R_{IIzI}$, which is a single-qubit quantum gate satisfying all execution constraints, by applying the pattern $P^+{}_1=H_1*\text{CNOT}_{13}$ to it.

Having determined adapted patterns $P_1$, the identity operator $P^+{}_1P_1=I$ may be inserted into the input quantum circuit $G_{in}$ in a fifth step 105. The identity operator can always be inserted in a quantum circuit without modifying its global properties.

$$P_1^+ = P_1'^+ P_1''^+ = H_3 CNOT_{23} H_1 CNOT_{13};$$

$$P_1 = P_1'' P_1' = CNOT_{13} H_1 CNOT_{23} H_3;$$

$$G_{in} = g_5 g_4 g_2 g_1 P_1^+ P_1;$$

$$G_{out} = g_3.$$

Now, the pattern $P_1$ may be added to the output quantum circuit $G_{out}$, and the adjoint pattern $P^+{}_1$ may be applied to the first quantum gate $g_1$ identified in the third step 103 and to each subsequent quantum gate $g_2$, $g_4$, $g_5$, updating them to $g'_5 g'_4 g'_2 g''_1$.

Clifford gates can be combined with the final measurement. CNOT-gates are Clifford gates. If the single-qubit quantum gates are Clifford gates as well, the adjoint pattern $P^+{}_1$ only comprises Clifford gates and can thus be combined with the final measurement.

In a sixth step 106, the first to fifth steps 101-105 may be reiterated.

In the first step 101 (of the first reiteration), the single-qubit quantum gate $g''_1=R_{IIzI}$ (corresponding to former first quantum gate $g_1$) is added to the output circuit, and the front layer may be updated.

$$G_{in} = P_1^+ g_5' g_4' g_2' = g_5' g_4' g_2';$$

$$G_{out} = g_1'' P_1 g_3 = R_{Hz} CNOT_{13} H_1 CNOT_{23} H_3 g_3.$$

It may then be continued with the further execution of the method.

The method may be reiterated until each quantum gate in the input quantum circuit satisfies each of the predetermined execution constraints. Execution of the method may be terminated when each quantum gate in the input quantum circuit $G_{in}$ are executable.

$$G_{out} = g_5'' P_5 g_4'' P_4 g_2'' P_2 g_1'' P_1 g_3; G_{in} = I$$

$g''_2$, $g''_4$, $g''_5$ correspond to executable versions of $g_2$, $g_4$, $g_5$.

$G_{out}$ only comprises single-qubit quantum gates, which can always be executed, and CNOT-gates CT between qubits that support direct coupling.

There may be different adjoint patterns P and combinations of adjoint patterns P that make the input quantum circuit $G_{in}$ executable.

Furthermore, the first quantum gate $g_1$ is not necessarily the best starting point for the compiling method. Since the first and second quantum gates $g_1$ and $g_2$ commute, the second quantum gate $g_2$ may be moved at the position of the first quantum gate $g_1$ and thus be the first quantum gate to be modified by applying an adjoint pattern $P^+$ to it.

The best adjoint patterns $P^+$ of a front layer may be determined by using a heuristic. More precisely, each adjoint pattern $P^+$ may be determined in such a way that it minimizes a heuristic, wherein the heuristic may be function of a number of CNOT-gates CT comprised by one or more patterns.

In a first type of heuristic $H_1$, each pattern determined in the fourth step 104 is determined in such a way that a number of CNOT-gates comprised by each pattern is minimized:

$$H_1 = \min\{Cost(R_P(\theta))\}$$

For example, there may be two different adjoint patterns each making a given quantum gate g executable. If the CNOT-cost of a first adjoint pattern is Cost(g)=2 and of a second adjoint pattern Cost(g)=3, then the first adjoint pattern will be chosen, since it has the smaller CNOT-cost.

A second type of heuristic $H_2$ allows choosing from different combinations of different adjoint patterns $P^+$ for quantum gates of the front layer the combination for which a weighted sum of CNOT-gates CT of all involved adjoint patterns $P^+$ is minimized.

$$H_2 = \sum_{R_P(\theta)} \frac{Cost(R_P(\theta))}{\delta^{index(R_P(\theta))}}$$

The CNOT-cost may be determined for each quantum gate $R_P(\theta)$, and the CNOT-cost for each quantum gate may be arranged in a sequence in ascending order, wherein an index index=[0, 1, 2 . . . ] is assigned to each element of the sequence. index=0 may be assigned to the first element of the sequence, index=1 is assigned to the second element of the sequence, etc. For example, the CNOT-cost of the adjoint patterns $P^+$ determined for the first and second gates $g_1$, $g_2$ may be:

$$Cost(g_2) = 1 \to index = 0; Cost(g_1) = 2 \to index = 1$$

$$H_2 = \sum_{R_P(\theta)} \frac{Cost(R_P(\theta))}{\delta^{index(R_P(\theta))}} = \frac{Cost(g_1)}{\delta^{index(g_1)}} + \frac{Cost(g_2)}{\delta^{index(g_2)}}$$

The are no restrictions regarding the value of $\delta$. Preferably, $\delta$ is comprised in a range from 1 to 3. For example, for $\delta=2$, the result is $$H_2 = \frac{1}{2^1} + \frac{2}{2^2} = 1.$$

$H_2$ may be calculated for different combinations of patterns. The sequence of patterns P of the front layer FL that minimizes the heuristic $H_2$ may be chosen.

A third type of heuristic $H_3$ allows choosing from different sequences of different patterns P for quantum gates of the front layer the combination for which the sum of CNOT-gates CT of all involved patterns P is minimized.

$$H_3 = \sum_{R_P(\theta)} Cost(R_P(\theta))$$

Thus, different combinations of adjoint patterns $P^+$ making the quantum circuit $G_{in}$ executable may be considered, and the sum of all involved CNOT-gates CT may be considered. For example, the CNOT-cost for the first and second quantum gates $g_1$ and $g_2$ may be: Cost($g_1$)=2; Cost($g_2$)=1, and $H_3$=3.

$H_3$ may be calculated for different combinations of patterns. The sequence of patterns that minimizes the heuristic H; may be chosen.

It is clear for a skilled person that different parts of the compiling method may be modified, or that the order of different parts of the method may be modified.

For example, the pattern P added in the fifth step 105 may be directly added to the output quantum circuit $G_{out}$. Alternatively, the pattern P may be first added to the input quantum circuit and then be transferred to the output quantum circuit $G_{out}$.

An exemplary pseudo-code implementation for the compiling method as described is shown hereafter:

```
procedure UpdatePauliSequence(Si, Ci, G)
    F ← FrontLayer(Si)
    R ← OneQubitRotations(F)
    if R/= Ø then
        for R ∈ R do
            Si ← Si · R+
            Ci ← R · Ci
        end for
    else
        Pbest ← I
        for P ∈ (Patterns × G) do
            if Heuristic(F, P) < Heuristic(F, Pbest) then
                Pbest ← P
            end if
        end for
        Si ← Si · P+best
        Ci ← Pbest · Ci
```

```
    end if
    return Si, Ci
end procedure
```

Figure 5:
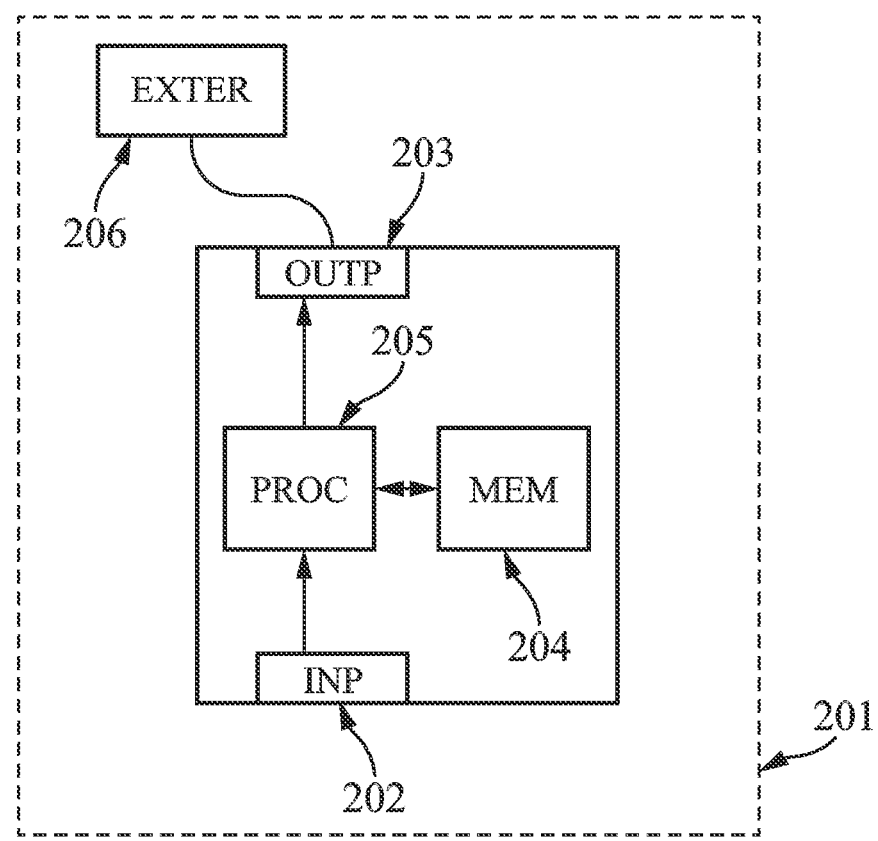
FIG. 5 shows a non-transitory computer readable storage medium configured to implement a method for iteratively converting an input quantum circuit comprising a sequence of quantum gates into an output quantum circuit compliant with predetermined execution constraints.

FIG. 5 shows a non-transitory computer readable storage medium 201 configured to implement the method of the present disclosure.

The non-transitory computer readable storage medium 201 may comprise a memory 204 for storing instructions for implementation of at least part of the method, the data received, and temporary data for performing the various steps and operations of the method.

The non-transitory computer readable storage medium 201 further comprises a control circuit 205.

This control circuit can be, for example, a processor or processing unit adapted to interpret instructions in the form of a computer program in a computer language, wherein the processor or the processing unit may comprise, may be associated with or be attached to a memory comprising the instructions. The control circuit can further be the association of a processor/processing unit and a memory, the processor or the processing unit being adapted to interpret instructions in a computer language, the memory comprising the instructions. The control circuit can further be an electronic card whose steps and operations of the method are described in silicon, or a programmable electronic chip such as an FPGA for "Field-Programmable Gate Array", as a SOC for "System On Chip" or as an ASIC for "Application Specific Integrated Circuit".

SOCs or systems-on-chips are embedded systems that integrate all the components of an electronic system into a single chip. An ASIC is a dedicated electronic circuit that brings together custom features for a given application. ASICs are generally configured during their manufacture for performing a dedicated task. The programmable logic circuits of the FPGA type are electronic circuits reconfigurable by the user of the method.

This non-transitory computer readable storage medium 201 comprises an input interface 202 for receiving messages, and an output interface 203 for providing configuration messages controlling any components involved in the implementation of the claimed method.

Depending on the embodiment, the non-transitory computer readable storage medium 201 may be a computer, a computer network, an electronic component, or another device comprising a processor operatively coupled to a memory 204, and, depending on the mode of operation or selected embodiment, a data storage unit, and other associated hardware elements such as a network interface and a media reader for reading a removable storage medium 206 and writing on such a medium not shown in the FIG. 5. The removable storage medium may be, for example, a flash disk, a USB stick, etc.

The memory 204, the data storage unit or the removable storage medium may contain instructions which, when executed by the control circuit 205, may cause this control circuit 205 to performing or controlling the input interfaces, output interface 203, data storage in the memory 204 and/or data processing and method implementation examples described herein.

In addition, the instructions can be implemented in software form, in which case it takes the form of a program executable by a processor, or in hardware form, or "hardware", as an integrated circuit specific application ASIC, a SOC on a microchip, or in the form of a combination of hardware and software elements, for example a software program intended to be loaded and executed on an electronic component described above such as FPGA processor.

The non-transitory computer readable storage medium 201 can also use hybrid architectures, for example architectures based on a CPU+FPGA, or an MPPA for "Multi-Purpose Processor Array".

It will be appreciated that the embodiments described above are illustrative of the invention disclosed herein and that various modifications can be made without departing from the scope as defined in the appended claims.

What is claimed is:

1. A compiling method for iteratively converting an input quantum circuit comprising a sequence of quantum gates into an output quantum circuit compliant with predetermined execution constraints, the method comprising the steps of:

(a) determining if a front layer of the input quantum circuit comprises at least one single-qubit quantum gate, and, if the front layer comprises at least one single-qubit quantum gate, transferring each of the at least one single-qubit quantum gate to the output quantum circuit, and updating the front layer;

(b) reiterating step (a) as long as the front layer comprises at least one single-qubit quantum gate;

(c) identifying in the front layer a quantum gate that does not satisfy at least one of the predetermined execution constraints;

(d) determining a pattern comprising at least two single-qubit quantum gates and at least one CNOT-gate in such a way that the at least one predetermined execution constraint not satisfied by the quantum gate identified in (c) is satisfied by the quantum gate when applying an adjoint of the pattern to the quantum gate;

(e) adding the pattern to the output quantum circuit, and applying the adjoint of the pattern to the quantum gate identified in (c) and to each subsequent quantum gate;

(f) reiterating (a)-(e) until each quantum gate in the input quantum circuit satisfies each of the predetermined execution constraints;

wherein each pattern determined in (d) is determined in such a way that a number of CNOT-gates comprised by at least one pattern is minimized.

2. The method of claim 1, wherein the at least two single-qubit quantum gates comprised by the pattern are Clifford gates.

3. The method of claim 1, wherein each pattern determined in (d) is determined in such a way that a number of CNOT-gates comprised by each pattern is minimized.

4. The method of claim 1, wherein each pattern determined in (d) is determined in such a way that a weighted sum of a number of CNOT-gates comprised by each pattern is minimized.

5. The method of claim 4, wherein each pattern determined in (d) is determined in such a way that a sum of a number of CNOT-gates comprised by each pattern is minimized.

6. A non-transitory computer readable storage medium, having stored thereon a computer program comprising program instructions, the computer program being loadable into a data-processing unit and adapted to cause the data-processing unit to carry out a compiling method for iteratively converting an input quantum circuit comprising a sequence of quantum gates into an output quantum circuit compliant with predetermined execution constraints according to claim 1.

* * * * *